United States Patent [19]

Koda et al.

[11] Patent Number: 5,597,525
[45] Date of Patent: Jan. 28, 1997

[54] METHOD FOR INJECTION MOLDING POLYETHYLENE TEREPHTHALATE

[75] Inventors: Hideaki Koda, Ueda; Hisashi Nakajima, Nagano-ken, both of Japan

[73] Assignee: A. K. Technical Laboratory Inc., Japan

[21] Appl. No.: 236,478

[22] Filed: May 2, 1994

[30] Foreign Application Priority Data

Apr. 30, 1993 [JP] Japan .................................... 5-128436
Apr. 14, 1994 [JP] Japan .................................... 6-099163

[51] Int. Cl.$^6$ ............................ B29C 47/76; B29C 47/82
[52] U.S. Cl. ................ 264/537; 264/211.23; 264/349; 366/89; 425/203; 425/208
[58] Field of Search ................ 425/203, 208; 366/89; 264/211.21, 349, 537, 211.23

[56] References Cited

U.S. PATENT DOCUMENTS

| | | | |
|---|---|---|---|
| 3,023,456 | 3/1962 | Palfey | 425/208 |
| 3,826,477 | 7/1974 | Kunogi et al. | 425/203 |
| 4,143,974 | 3/1979 | Strassheimer | 366/78 |
| 4,670,203 | 6/1987 | Chang | 264/40 |
| 4,863,652 | 9/1989 | Chang | 425/203 |
| 4,946,536 | 8/1990 | Kumazaki | 425/203 |
| 5,308,562 | 5/1994 | Wohlfahrt-Laymann | 425/203 |

FOREIGN PATENT DOCUMENTS

| | | |
|---|---|---|
| 364060 | 4/1990 | European Pat. Off. . |
| 3744553 | 7/1989 | Germany . |
| 9002577 | 7/1991 | Netherlands . |

OTHER PUBLICATIONS

Modern Plastics International, vol. 7, No. 4, Apr. 1977, Lausanne CH, pp. 57–59, Bishop, "Vented–screw injection molding".

*Primary Examiner*—Robert A. Dawson
*Assistant Examiner*—Kenneth M. Jones
*Attorney, Agent, or Firm*—Ostrolenk, Faber, Gerb & Soffen, LLP

[57] ABSTRACT

A method for injection molding polyethylene terephthalate by employing a vent type injection unit as means for omitting preliminary drying the resin, wherein the unit does not develop a poor screw biting, and even when the molding material is an undried uncrystallized or crystallized PET, can feed a certain amount of the material at all times to injection mold a desired transparent molded form such as a preform, and use the preform to produce a thin-wall container at a low cost.

11 Claims, 1 Drawing Sheet

1

METHOD FOR INJECTION MOLDING POLYETHYLENE TEREPHTHALATE

BACKGROUND OF THE INVENTION

1. Field of the Invention

The present invention relates to a method for injection molding an uncrystallized or crystallized polyethylene terephthalate into a desired molded form such as preform, with pre-drying omitted.

2. Background Art

A pellet of the polyethylene terephthalate (PET) produced by bulk polymerizing of ethylene glycol with terephthalic acid or dimethyl terephthalate is an uncrystallized and transparent material. The PET whose moisture content does not reach an equilibrium has further moisture-absorption characteristics and thus when the PET is molten in a moisture absorbed condition, a hydrolysis develops to prevent the PET from being molded.

An uncrystallized PET pellet, when heated to a temperature above its glass transition point (Tg), becomes softened somewhat to have an adhesive characteristics. The adhesive characteristics causes the PET pellets to be poorly bitten into by a screw and thus not to be fed when molding. On the other hand, a crystallized PET pellet, even at a temperature above its Tg, is not softened, thereby keeping its hardness and having no adhesive characteristics.

Thus, material manufacturers dry an uncrystallized PET pellet at a temperature of 150° to 160° C. to produce a dehumidified and crystallized PET pellet which is sold as a commercially available molding material. This causes the ordinary and commercially available PET to become more expensive than an uncrystallized PET. The uncrystallized PET, which has been sold by some of material manufacturers, has to be dried to effect dehumidification and crystallization by molding manufacturers before use. Therefore, the crystallized PET described herein means a dried commercially available product, while the uncrystallized PET means an undried product. In molding a product using the PET as a material, even the crystallized PET has moisture-absorption characteristics and thus absorbs moisture to some extent varying with control conditions before it is used as a molding material; thus it is customary to dry preliminarily the PET immediately before molding.

It takes about four hours to accomplish the preliminary drying at a temperature of 150° C. Both the increased usage of material per hour to improve molding cycle efficiency, and the prevention of a shortage of fed material during a long time operation causes a dryer installed to an injection molding machine to become inevitably large in size and the power consumption required for drying to tend to increase. Problems exist in that it takes a lot of time to make preparations before the molding operation, and that a malfunctioned dryer affects seriously the molding operation.

Injection molding means omitting the preliminary drying can be devised. As such molding means, there has been known a vent type molding machine in which an injection screw in a heating cylinder is divided into a first stage and a second stage, and the moisture content in a molten resin in the first stage is removed to the outside through a vent opening provided between both the stages.

In this well-known vent type molding machine, the screw groove of a feeding zone of the first stage leading from the rear end at which a hopper is located to a metering zone at the front end is formed in a deep groove; pellets of the material resin fed from the hopper in a humid condition are molten due to shearing heat and compression while being sequentially fed by screw rotation; and then the groove leads through the metering zone having a shallow groove to the second stage.

The screw groove in the second stage is formed in a deep groove, so that when the molten resin is transferred to the groove, the pressure of the molten resin is reduced due to the rapid increase in the groove depth of the screw to cause the moisture content in the resin to be vaporized, and the moisture content in the resin by screw rotation to be separated, which moisture content is then sucked and removed through the vent opening by a vacuum pump. The molten resin whose moisture content has been removed in this manner is fed by screw rotation to a metering zone at the front end of the second stage, and then to a position in front of the screw to a store, in a similar manner to an injection molding machine having an ordinary mechanism. The molten resin thus stored is injected and loaded into a cavity by the forward movement of the injection screw after stoppage of screw rotation.

Although generally the employment of such vent type injection unit may allow even a material having a large amount of moisture absorption to be molded without the preliminary drying, such unit is not applied to all resins, and with respect to the PET, particularly an uncrystallized one, the pellet is softened and compressed in a feed zone to cause it to be accumulated, whereby the PET in the hopper cannot enter the zone, and the biting by the screw becomes extremely poor such that the material cannot be fed. As a result, it has been quite difficult to perform injection molding without the necessity of the preliminary drying by employing a conventional vent type injection unit.

SUMMARY OF THE INVENTION

The present invention is devised to solve problems with the above-mentioned conventional PET injection molding, and it is an object of the invention to provide a method for injection molding the PET by which although a vent type injection unit is employed as means for omitting preliminary drying, the unit does not develop a poor screw biting, and even when a molding material is an uncrystallized or crystallized PET, it can feed a certain amount of the material at all times to injection mold a desired transparent molded form such as a preform, and use the preform to produce a thin-wall container with a low cost.

The present invention according to the above-mentioned purpose employs a vent type injection unit in which an injection screw comprising a first stage and a second stage is rotatably and movably mounted in a heating cylinder having a vent, and limits the feed rate of the material resin to a feed zone of the first stage of the vent type injection unit in such a manner that the material resin does not accumulate due to compression even if the material resin is softened to an elastomeric state before reaching a compression zone in front of the feed zone. This limitation is effected by making the sectional area of the screw groove in a receiving zone at the feed zone rear end at which the hopper port of the first stage is located smaller than the sectional area of the screw groove in the feed zone, in which condition an uncrystallized or crystallized polyethylene terephthalate produced with the preliminary drying omitted is loaded in the hopper as a material resin to be plasticated and injected.

Although it is preferable that the sectional area of the screw groove in the above-mentioned receiving zone 11 is set to no larger than ¾ the sectional area of the screw groove in feed zone, a smaller sectional area thus set causes the feed rate to become lower and the material metering time to become longer than is required, so that it is most preferable that the former accounts for ⅔ to ½ the latter. In order to feed the PET faster, the screw is formed in a double screw to the halfway position of the compression zone, and then in a single screw from the compression zone to the metering zone so as to set the screw pitch to a large value, thereby making the stretching of the molten resin sufficient to improve the vent effect in a vent opening of the second zone.

In addition, the molding is performed in such a manner that the heating temperature on the second stage side of the heating cylinder is set to a value lower than the heating temperature on the first stage side, thereby preventing acetaldehyde occurrence due to an overheated molten resin.

The removal of the moisture content in the resin from the above-mentioned heating cylinder is performed by being sucked under a reduced pressure by means of a vacuum pump, which removal is not interrupted even when injecting during operation, and when injecting, the reduced pressure is set to a value lower than that when plasticating, thereby preventing a vent up due to the forward movement of the injection screw. An injection molded preform is immediately or later transferred to a blowing mold, where it can be stretch-blow molded into a packaging container such as a thin-wall bottle.

BRIEF DESCRIPTION OF THE DRAWINGS

Drawings show an example of a vent type injection unit capable of performing the injection molding method of the present invention, in which.

DETAILED DESCRIPTION OF THE PREFERRED EMBODIMENTS

Figure 1:
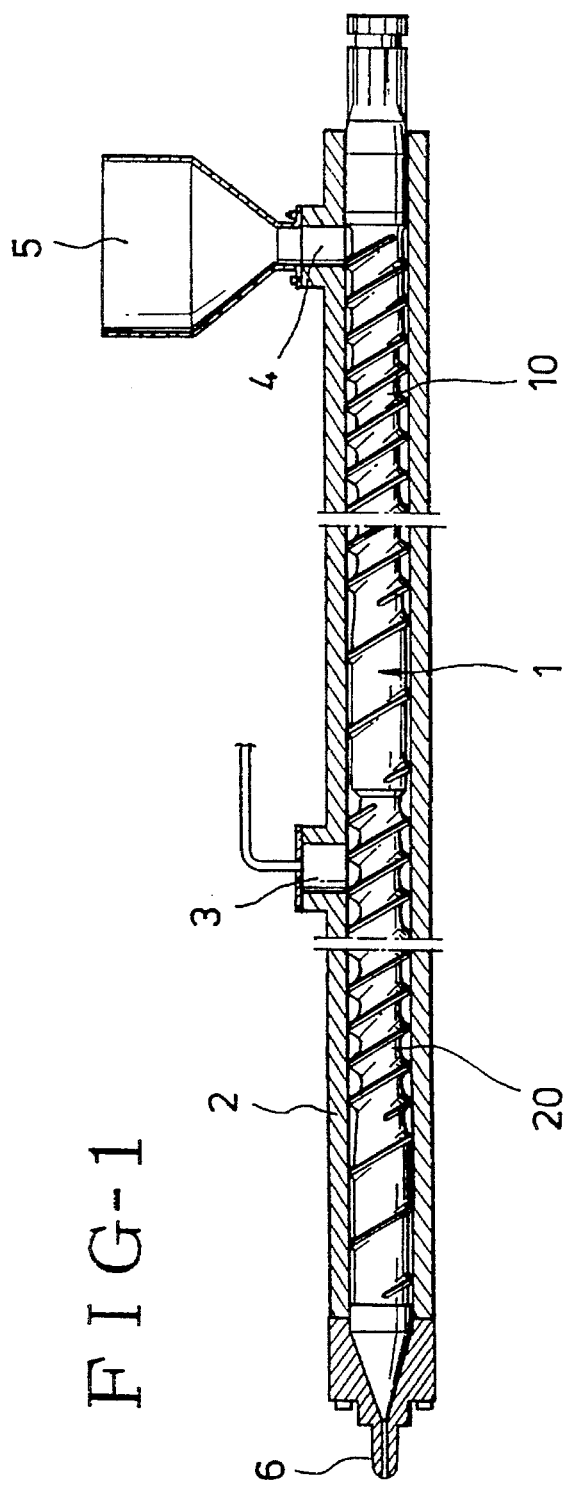
FIG. 1 is a schematic longitudinal sectional and side view of the vent type injection unit according to the present invention.

In the Figures, the numeral 1 indicates an injection screw which is rotatably and movably inserted into a heating cylinder 2. The injection screw 1 has a shape such that two screws having a deep groove section and a shallow groove section are connected to each other to form a single screw, and has a screw design such that a screw portion 10 located in the rear portion of the heating cylinder 2 comprises a first stage (10), while a screw 20 located in the front portion thereof comprises a second stage (20).

The above-mentioned heating cylinder 2 includes a vent opening 3 on the wall portion on which the rear portion of the second stage 20 is located, which opening is enclosed and connected with a vacuum pump (whose view is omitted). On the rear wall portion on which the rear portion of the first stage 10 is located, there is bored a feed port 4, which is mounted with a hopper 5 for PET pellets (hereinafter simply called a resin). On the outer periphery of the heating cylinder 2 and a nozzle 6, there are provided band heaters, though omitted in Figs., for heating the resin fed by screw rotation from the above-mentioned feed port 4.

Both the above-mentioned vent opening 3 and the feed port 4 have an opening width with substantially the same size as the pitch of the screw they face.

Figure 2:
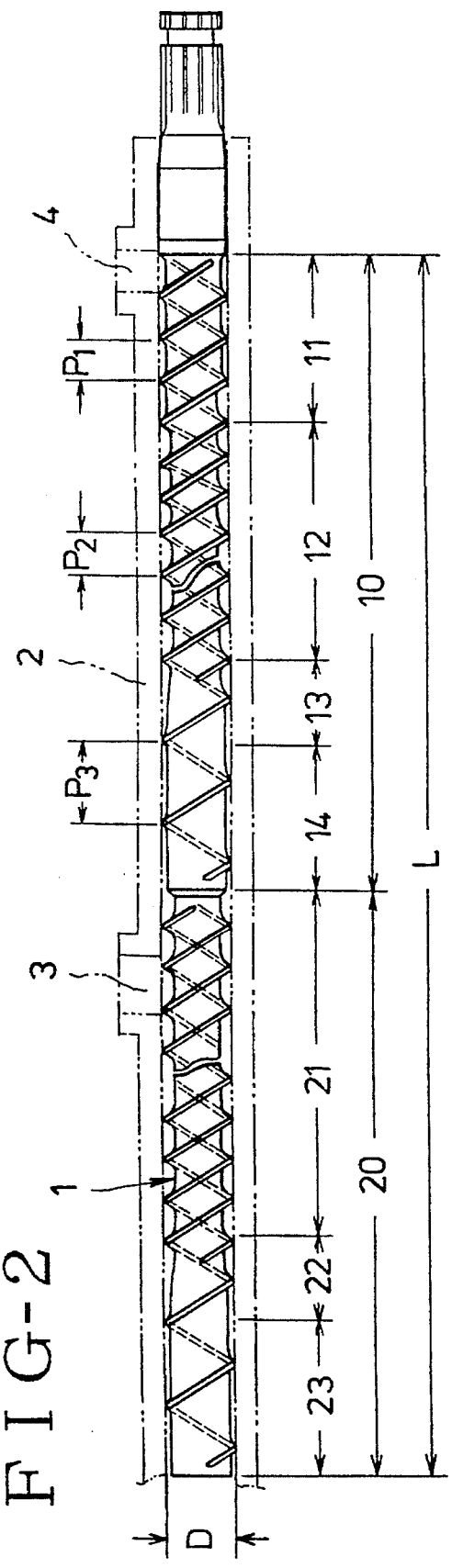
FIG. 2 is an enlarged side view of a screw provided in the vent type injection unit of FIG. 1, in which a front end thereof is omitted.

FIG. 2 shows a screw design of the above-mentioned injection screw 1, in which the ratio of the first stage 10 to the second stage 20 in the overall length L is about 6:4, thus the second stage 20 is formed shorter than the first stage 10. The first stage 10 is divided into four zones which are, from the rear, a receiving zone 11, a feed zone 12, a compression zone 13 and a metering zone 14, while the second stage 20 is divided into three zones from the rear which are a feed zone 21, a compression zone 22 and a metering zone 23.

In the first stage 10 and the second stage 20, the screw is formed in a double screw up to the halfway position of the compression zones 13 and 22 except for the metering zones 14 and 23, whereby the feed of the material resin to the compression zones 13 and 22 by screw rotation is performed as fast as possible; while the screw in the metering zones 14 and 23 is formed in a single screw to widen the screw pitch in order to reduce as small as possible an non-uniformity of the molten resin.

In the first stage 10, the screw pitch $P_1$ of the receiving zone 11 is set to a value smaller than the screw pitch $P_2$ of the feed zone 12, while the screw pitch $P_3$ of the metering zone 14 is set to a value twice the above-mentioned screw pitch $P_2$. The screw pitch of the feed zone 21 and the metering zone 23 of the second stage 20 is set in a similar manner to the screw pitch of the first stage 10.

The screw groove depth of the first stage 10 is set at the dimension calculated from the screw groove depth of the feed zone 12. In order to limit the feed rate in the feed zone 12, the screw groove depth in the above-mentioned receiving zone 11 is set to a shallow depth such that the sectional area of the screw groove in relation to the above-mentioned screw pitch $P_1$ becomes ⅔ the sectional area of the screw groove of the feed zone 12; while the screw groove depth in the metering zone 14 is set to a depth shallower than in the receiving zone 11 in order to stretch the molten resin by screw rotation.

The screw groove depth in the feed zone 21 of the second stage 20 is set to a deepest depth in order to vaporize the moisture content in the molten resin by a rapid pressure reduction; while the screw groove depth in the metering zone 23 is set to a value deeper than in the metering zone 14 of the first zone 10, thereby making easy the feed of the molten resin by screw rotation.

To injection mold a molded article such as a preform using an uncrystallized PET by employing the vent type injection unit having the above-mentioned arrangement, first the temperature of the heating cylinder 2 containing the second stage 20 is set to 270° C., and the temperature of the heating cylinder 2 containing the first stage 10 holds is set to 280° C. The undried and uncrystallized PET as a molded material is loaded in the above-mentioned hopper 5, and then the injection screw 1 is caused to rotate at a high speed (100 rpm). The pressure of the opening 3 is reduced to about −730 mm Hg by the vacuum pump.

The PET in the hopper 5 is fed by screw rotation into the receiving zone 11. The feed rate of the PET from the receiving zone 11 to the feed zone 12 is limited as a result of the sectional areas of the zones, so that the PET in the feed zone 12 does not excessively accumulate, and thus even if the PET is softened to an elastomeric state, pellets are not massed with each other due to compression and not accumulate before the resin reaches the compression zone 13.

The PET softened in the feed zone 12 is compressed by the tapered surface of the compression zone 13 to cause it to be molten, stretched and temporarily plasticated, so that the PET is fed into the second stage 20 whose temperature is set to a value lower than the first stage 10. The screw groove of the feed zone 21 is formed in a deep groove, so that the pressure of the molten resin is reduced to cause the moisture content in the PET to vaporize, and the moisture content in the molten PET to be separated therefrom, which moisture content is then sucked and removed through the vent opening 3 by the vacuum pump. The molten PET whose moisture content has been removed in this manner is fed by screw rotation to the metering zone 23 of the second stage 20 and further plasticated, and then fed to a position in front of the screw to a store, in a similar manner to an injection molding machine having an ordinary mechanism. As the molten PET is fed, the injection screw 1 is moved backwardly and stopped at a desired position to meter an amount required for injection. After metering, the molten resin is injected and loaded into a mold by forwardly moving the injection screw 1. Then the pressure of the vent opening 3 is changed to about −650 mm Hg and maintained by the vacuum pump during the injection operation. The atmospheric pressure can be easily controlled by taking the outer air into a suction line through valve operation.

The preform thus injection molded was transparent similar to the case where a preliminary drying is performed before injection molding, and has no cloudiness due to hydrolysis, and also has an acetaldehyde content within an allowable range.

An example of the specifications of the vent type injection unit of the present invention will be shown hereinafter:

| Injection screw (double screw) | | | |
|---|---|---|---|
| Screw length (L) | 1670 mm | | |
| Screw outside diameter (D) | 64 mm | | |
| L/D of Screw | 26 | | |
| | (Length) | (Screw minor dia.) | Screw pitch |
| First stage | | | |
| Screw | 998 mm | | |
| Receiving zone | 128 mm | 52.0 mm | 32.0 mm |
| Feed zone | 646 mm | 45.0 mm | 38.5 mm |
| Compression zone | 64 mm | | |
| Metering zone | 160 mm | 57.2 mm | 77.0 mm |
| Second stage | | | |
| Screw | 672 mm | | |
| Feed zone | 448 mm | 43.2 mm | 38.5 mm |
| Compression zone | 64 mm | | |
| Metering zone | 160 mm | 56.0 mm | 77.0 mm |
| Screw revolution speed | 100 rpm | | |
| Injection stroke | 120 mm | | |

When the PET is crystallized it is softened in the feed zone 12 more slowly and transferred to the compression zone 13 faster than the uncrystallized PET, thereby tending to develop an uneven melting. However, this problem can be solved by setting the compression zone 13 to a length somewhat longer than the above-mentioned numerical value.

The employment of the above-mentioned vent type injection unit allows the injection molded preform to be molded into a thin-wall packaging container such as a bottle by the well-known stretch-blow molding. The well-known stretch-blow molding is broadly classified into a so-called two stage type in which the injection molding of the preform and the stretch-blow molding of the preform into a container are performed in separate processes, and a so-called one stage type in which the injection molding of the preform through the stretch-blow molding of the preform into a container are continuously performed. In either of both the methods, the PET preform produced by the injection molding with the preliminary drying omitted can be molded into a thin-wall container in the same manner as with the PET preform injection molded after being dried.

The following shows molding conditions in a case where with an injection molded preform held at its neck to a limit in which its shape can be kept, the preform is released from a cavity and a core, transferred to a blowing mold when the surface temperature of the preform is being raised due to an internal potential heat, and immediately stretch-blow molded to mold a thin-wall container:

Material resin: UNIPET RY523 (manufactured by Unipet Co., Ltd.)
Molded form: flat bottle
  Dimensions:
    overall height 250 mm
    port inside dia. 23.5 mm
    length under neck 230 mm
    body outside dia. 90×50 mm
    body wall thickness 0.4 mm
    weight 36 g
Preform
  Dimensions:
    Overall height 142 mm
    port inside dia. 23.5 mm
    length under neck 122 mm
    body wall thickness 2.9 mm
    body upper portion outside dia 28 mm
    body lower end outside dia. 24 mm
    draft 2/122
Preform molding conditions
  Injection cylinder temperature
  First stage: Front 285° C., middle 285° C., rear 280° C.
  Second stage: Front 270° C., rear 270° C.
  Nozzle temperature: 270° C.
  Injection mold temperature (set value)
  Cavity mold: 15° C.
  Core mold: 15° C.
  Injection pressure (dwell): 75 kg/cm$^2$
  Loading dwell time: 6.0 sec.
  Cooling time: 2.8 sec.
  Releasing temp.: 60° to 70° C. (preform surface temperature)
Stretch-blow molding conditions
  Mold temperature (set value): 20° C.
  Stretch-blowing temperature: 88° C. (preform surface temperature)
  Blowing pressure (stretching): 20 kg/cm$^2$
  Blowing time: 2.0 sec.
Percent of stretch:
  Longitudinal (axial direction): 190%
  Lateral (radial direction): 360×200%

As described above, according to the present invention, the injection molding of an uncrystallized PET and that of a crystallized PET with the preliminary drying omitted can be performed by the employment of the vent type injection unit, thereby allowing a molded article having little hydrolysis to be obtained. A molded article having developing little acetaldehyde due to overheating is obtained so that uncrystallized PET having a lower commercial price can be utilized as a molding material, whereby the material cost is reduced and the running cost required for the preliminary drying can be saved even using the crystallized PET, thereby allowing the price of a packaging container made from the PET as a material to be reduced. The present invention has a further advantage in that the injection molding itself requires no complex operation and can be performed by employing conventional molding technologies, thereby having a significantly high utility value in this industrial field.

What is claimed is:

1. A method of injection molding an undried polyethylene terephthalate employing a vent-type injection unit comprising a heating cylinder having an inside wall, a vent, a hopper and an injection screw rotatably and movably mounted in the cylinder, the length of said injection screw being divided into sequential first and second stages, each of said first and second stages being divided in sequence into a feed zone, a compression zone and a metering zone, said first stage also having a receiving zone connected to said feed zone of said first stage and receiving said undried polyethylene terephthalate from the hopper, said vent being located at a position corresponding to the feed zone of the second stage, said method comprising providing said undried polyethylene terephthalate in said hopper, causing said screw to rotate to thereby convey any polyethylene terephthalate present in the area between said injection screw and the inside wall of the heating cylinder, receiving said polyethylene terephthalate in the receiving zone of the first stage from the hopper, feeding and plasticizing said polyethylene terephthalate, wherein the feeding rate of the polyethylene terephthalate is limited by an arrangement such that the depth of the screw groove in the receiving zone is shallower than the depth of the screw groove in the feed zone, thus making an area available between two adjacent screw flights for molding the polyethylene terephthalate smaller in the receiving zone than in the feed zone of said first stage, and removing volatile substances from the polyethylene terephthalate through the vent.

2. A method of injection molding an undried polyethylene terephthalate according to claim 1, wherein said area available for said polyethylene terephthalate in said receiving zone is not more than ¾ of said area available for said polyethylene terephthalate in said feed zone of the first stage, and wherein the injection screw in said receiving zone of the first stage, in each of said feeding zones of said first and second stages and in the first half of each of said compression zones of said first and second stages is formed in a double screw, and the injection screw in an area from said first half of each of said compression zones of said first and second stages to each of said metering zones of said first and second stages is formed in a single screw so as to effectively mix and stretch the plasticized polyethylene terephthalate.

3. A method of injection molding an undried polyethylene terephthalate to claim 1, wherein a reduced pressure is established at said vent whereby moisture contained in said undried polyethylene terephthalate is removed from said vent-type injection unit and extent of the reduced pressure is varied during the injection molding to a lower value.

4. A method for injection molding an undried polyethylene terephthalate as set forth in claim 3, wherein the heating cylinder is heated such that the temperature in the first stage is greater than the temperature in the second stage.

5. A method for injection molding an undried polyethylene terephthalate as set forth in claim 4, wherein the an undried polyethylene terephthalate is undried, crystallized polyethylene terephthalate.

6. A method for injection molding an undried polyethylene terephthalate as set forth in claim 4, wherein the undried polyethylene terephthalate is uncrystallized polyethylene terephthalate.

7. A method for injection molding an undried polyethylene terephthalate as set forth in claim 1, wherein a preform of a thin-wall packaging container to be molded by stretch-blow molding is injection molded.

8. A method of injection molding an undried polyethylene terephthalate to claim 1, wherein a reduced pressure is established at said vent whereby moisture contained in said undried polyethylene terephthalate is removed from said vent-type injection unit and extent of the reduced pressure is varied during the injection molding to a lower value.

9. A method for injection molding an undried polyethylene terephthalate as set forth in claim 1, wherein the heating cylinder is heated such that the temperature in the first stage is greater than the temperature in the second stage.

10. A method for invention molding an undried polyethylene terephthalate as set forth in claim 1, wherein the undried polyethylene terephthalate is undried, crystallized polyethylene terephthalate.

11. A method for injection molding an undried polyethylene terephthalate as set forth in claim 1, wherein the undried polyethylene terephthalate is uncrystallized polyethylene terephthalate.

* * * * *